Nov. 15, 1960  J. R. ZILAI  2,960,207
VARIABLE PROCESS CONTROL TIMER
Filed Dec. 2, 1958  3 Sheets-Sheet 1

INVENTOR
JOHN R. ZILAI
BY
B. P. Fishburne, Jr.
ATTORNEY

Nov. 15, 1960 J. R. ZILAI 2,960,207
VARIABLE PROCESS CONTROL TIMER
Filed Dec. 2, 1958 3 Sheets-Sheet 2

INVENTOR
JOHN R. ZILAI

BY *B. P. Fishburne, Jr.*
ATTORNEY

Nov. 15, 1960 J. R. ZILAI 2,960,207
VARIABLE PROCESS CONTROL TIMER
Filed Dec. 2, 1958 3 Sheets-Sheet 3

INVENTOR
JOHN R. ZILAI

BY B. P. Fishburne, Jr.
ATTORNEY

United States Patent Office 2,960,207
Patented Nov. 15, 1960

2,960,207

VARIABLE PROCESS CONTROL TIMER

John R. Zilai, 715 Union Lane, Brielle, N.J.

Filed Dec. 2, 1958, Ser. No. 777,767

10 Claims. (Cl. 198—40)

The present invention relates to a variable process control timer.

When work is processed automatically on conveyors and a variety of work requiring different handling or treatment is fed into the conveyor in a random or scrambled sequence, it is difficult to know at the point of entrance what the situation will be several cycles of operation of the conveyor hence, when the work arrives at a remote station down the line for a variable treatment. This is particularly a problem when all of the work units first pass through a long series of uniform treatment operations which places the special or variable operations at a greater distance and time of arrival from the point of entrance. If, on arrival at the variable treatment stations, there are no empty spaces available for the work units, a traffic bottleneck is created and all following work is held up and possibly spoiled.

A primary object of the present invention is to provide visual information for an operator at the entrance station of the system and to thereby permit the maximum use of the conveyor equipment without traffic jams down the line later on. More specifically, if all variable treatment stations are occupied with long term work, the timer panel would indicate at the entrance station, not to add any more work units into the system until such time when it will be clear to receive more work. Thus, in a sense, the timer device predicts ahead what the situa- will be at a future time when the work has passed through all of the preceding uniform progressive treatment stations and will arrive at the distant variable stations. This it does by subtracting from a scale, each cycle of operation of the conveyor system as the cycle time lapses.

A further object of the invention is to provide variable process timer means which will indicate visually to the operator at the entrance station when loading of the work onto the conveyor may take place, and also indicate visually to the operator the true location of work throughout the entire system at all times.

Other objects and advantages of the invention will become apparent during the course of the following description.

In the accompanying drawings forming a part of this application and in which like numerals are employed to designate like parts throughout the same, Figure 1 is a diagrammatic plan view of a typical treatment conveyor with which the timer of the present invention may be employed.

Figure 1:
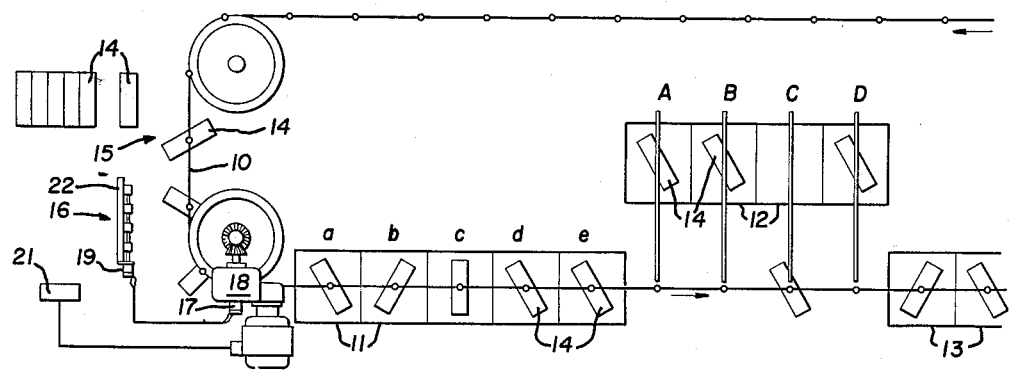

While Figure 1 represents a typical application of the timer in connection with a variable process conveyor, it will be understood as the operation of the device becomes clearer during the following description, that the timer may be used equally well on other installations, such as assembly line conveyors with variable and uniform work stations, storage or stock conveyors, and the like, and it is intended not to limit the invention to any particular use or application of the timer.

With reference to the drawings, and in particular Figure 1, the numeral 10 designates the conveyor chain of a processing conveyor apparatus, which apparatus may embody a plurality of longitudinally arranged substantially identical pre-treatment tanks 11, as shown. For convenience of description, the group of pre-treatment tanks 11 may be said to define pre-treatment stations a, b, c, d and e. The apparatus of Figure 1 may further comprise a series of long variable-treatment tanks 12, shown offset to one side of the pre-treatment tanks 11 in diagrammatic Figure 1 for the purpose of simplification of description. The tanks 12 may be said to define long variable-treatment stations A, B, C and D. Following the variable-treatment tanks 12 in the apparatus of Figure 1, there may be included in the apparatus additional tanks 13 for further uniform treatment of the work units 14 which are placed upon the conveyor chain 10 at an entrance or loading station 15.

The timer of the present invention is shown generally at 16 in Figure 1, adjacent to the work loading station 15. A device 17 such as a synchro-transmitter is connected with the conveyor drive means 18 in Figure 1, and a device 19 such as a synchro-receiver is mounted on the timer 16 and connected to the main drive shaft 20 of the timer to synchronize the operation of the timer with the cyclic operation of the conveyor chain 10. Any other preferred means may be employed to interconnect the drive shaft 20 of the timer 16 with the drive means 18 of the processing conveyor so that the timer and conveyor chain 10 will have a synchronized cycle of operation. The numeral 21 in Figure 1 designates a control device for the conveyor apparatus, enabling the operator at the loading station 15 or near the loading station to start and stop the conveyor and to otherwise control its operation.

The term "cycle" in connection with the operation of the conveyor chain 10 as used herein designates either the time elapsing between two consecutive displacements forward of the conveyor chain or the linear distance traversed by the conveyor chain 10 corresponding to this time.

The conveyor apparatus shown in Figure 1 is used for carrying the work units 14 undergoing a definite process or treatment. Said process comprises two series of operations which may be referred to as "operations of pre-treatment" within the tanks 11 at the pre-treatment stations a, b, c, d and e, and "operations of long variable-treatment" within the tanks 12 at the stations A, B, C and D.

From the arrangement of the pre-treatment stations, here five in number for the purpose of illustration, it can be seen that each work unit 14 after being loaded onto the chain 10 undergoes successively each one of the operations or treatments performed at the stations *a–e* without being removed from the conveyor chain 10.

Since all work units 14 are subjected to identical pre-treatment in the tanks 11, it is evident that the operations at the stations *a*, *b*, *c*, *d* and *e* have the same time duration. Therefore, the cyclic movement of the conveyor chain 10 is regular and intermittent. For example, the conveyor chain 10 might travel a linear distance of three yards forward every ten minutes, three yards being the distance between two consecutive stations *a* and *b*, *b* and *c*, etc., and ten minutes being the time duration of the operations performed at the pre-treatment stations *a*, *b*, *c*, *d* and *e*.

After a work unit 14 leaves the pre-treatment stage of the apparatus in Figure 1, it enters the long variable-treatment stage defined by the stations A, B, C and D. A first difference existing between the two stages lies in the fact that all work units 14 will not necessarily undergo the same operations or treatments at the stations A, B, C and D of the long variable-treatment stage. Some work units may be directed to station A alone, some to station B alone, some to station A and then to station B, and some work units may undergo none of the operations at stations A, B, C and D, whereas all work units 14 went through the same pre-treatment at stations *a–e*. Another difference between the pre-treatment and long variable-treatment stages concerns the time duration of the operations at stations A, B, C or D, which is greater than one cycle of operation of the conveyor chain 10, and varies from one station to another of the long variable-treatment stage. Also, at a given station A, B, C or D, the time duration of the operation performed may vary from one work unit 14 to another, where the work units are not all alike.

Another difference between the uniform pre-treatment stage and the long variable-treatment stage of the system is that the stations A, B, C and D are located individually at different distances from the end station *e* of the pre-treatment stage, whereas in the pre-treatment stage consecutive operations are performed in equally distant stations.

In brief, the timer apparatus 16 of the invention is a means of controlling the loading of the work units 14 on the conveyor chain 10 with regard to the conditions that will prevail at the remote long variable-treatment stage, or taking into account the vacancies that will exist at the stations A, B, C and D when the work unit being loaded on the conveyor actually reaches the remote variable treatment stage of the apparatus.

The timer apparatus 16 comprises a panel 22 which is vertically disposed in use. This panel carries in the presently illustrated embodiment four identical timer units 23 corresponding to the variable-treatment stations A, B, C and D. Each timer unit 23 embodies a vertical screw shaft 24 arranged adjacent to a vertical slot 25 formed through the panel 22 as shown. Each shaft 24 is journaled for rotation at its upper and lower ends within a bearing block 26 and a bearing rail 27 mounted respectively upon the rear side of the panel 22 near the top and bottom edges of the same. The lower ends of the several spaced screw shafts 24 carry bevel gears 28, permanently meshing with companion bevel gears 29 on the horizontal main drive shaft 20 of the timer apparatus 16. The end portions of the drive shaft 20 are journaled for rotation in suitable bearings 30, rigidly mounted upon the rear side of the panel 22 adjacent to its lower corners. As may now be seen, cyclic rotation of the drive shaft 20 in synchronism with the cyclic operation of the conveyor chain 10 will cause the screw shafts 24 to rotate in unison and at the same speed.

On opposite sides of each slot 25 of each timer unit 23 are a pair of additional vertical slots 31 and 32, and with the slot 31 being longer than the slot 32 and the latter disposed adjacent the lower portion of the central slot 25 and extending somewhat below the bottom of the longer slot 31.

Figure 5:
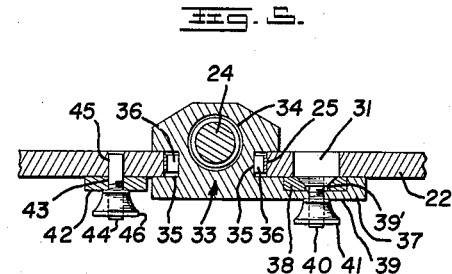
Figure 5 is a horizontal section taken on line 5—5 of Figure 4.

Slidably mounted within the slot 25 of each unit 23 is an index block or element 33 having a vertical opening 34 to receive the adjacent screw shaft 24 and free from screw-threaded engagement therewith, so that the index block 33 may be freely shifted lengthwise of the screw shaft 24 within the slot 25. The index block 33 is grooved on opposite sides as at 35, inwardly of the edges of slot 25, and a pair of leaf springs 36 are disposed within the grooves 35 and bear against the edges of the slot 25 as best shown in Figure 5. The frictional engagement of the springs 36 with the edges of the slot 25 enables the index element 33 to be adjusted lengthwise of the slot 25 at will, and the index element will remain in the selected adjusted position due to the frictional action of the springs 36 with the slot 25.

At the forward side of the panel 22, the index element 33 carries a lateral extension 37 upon one side of the same and crossing or overlying the elongated slot 31. A first rule or straight edge 38 is seated within a groove 39 formed in the rear face of the extension 37, and the rule 38 extends lengthwise of the slot 31 directly in front of the same. The rule 38 has a central longitudinal slot 39' formed therethrough to receive a screw 40 carrying a clamping nut 41 upon its forward end. By this means, the rule 38 is adjustably rigidly carried by the extension 37 of the index element 33, and the rule may be readily adjusted lengthwise as should be apparent.

A second rule or straight edge 42 is arranged upon the opposite side of the central slot 25 and parallel thereto, and this rule is somewhat longer than the first rule 38 and has its lower end portion overlying the slot 32. The rule 42 has a longitudinal slot 43 formed therethrough and receiving a stud or screw 44, mounted within an opening 45 of the panel 22, as shown. The screw 44 carries a clamping nut 46 upon its forward end for clamping engagement with the rule 42. By this means, the rule 42 is adjustable lengthwise and may readily be locked in the selected adjusted position.

The rule 42 is provided along its inner longitudinal edge with a scale X for indicating the time duration of the variable-treatment at the stations A, B, C or D. The graduations 47 of the scale X are uniformly spaced, and the spacing between each pair of graduations represents one cycle of operation of the conveyor chain 10.

An additional scale W is provided upon the forward face of the panel 22 along the outer edge of slot 32, and this scale W may be defined as the approach setting scale for the variable-treatment adjustable rule 42 provided with the scale X. The graduations 48 of the scale W are also spaced like the graduations 47 to represent cycles of operation of the conveyor chain 10.

A scale Y is likewise provided upon the front face of the panel 22 along the edge of the slot 25 nearest the rule 38. This scale Y is the total treatment time scale and is also graduated as at 49 to show complete cycles of operation of the conveyor chain 10.

The movable rule 38 bears a scale Z along its inner edge indicating the time of approach of the work units 14 toward the long variable-treatment stage of the system. Approach, as here used, designates the time or number of cycles elapsing between the loading of the work units at the entrance station 15 and the effective reaching of the particular variable-treatment station A, B, C or D. As can be observed in Figure 1, the approach time is actually the sum of the time elapsed between the loading of the work units and the pre-treatment stage, the total time of pre-treatment at the stations *a*, *b*, *c*, *d* and *e*, and the time between the end of pre-treatment and the actual beginning of variable-treatment at the stations A, B, C or D. As a consequence, the approach will be one cycle greater for reaching variable-treatment station B than it is for reaching station A, and so on for station C relative to station B. This situation has been illustrated in Figure 2 and in Figure 9 of the drawings, where the approach settings appear to increase from left to right in the views by increments of one cycle.

Figure 6:
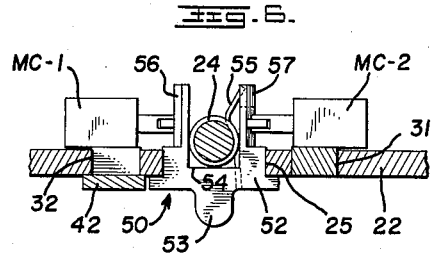
Figure 6 is a similar section taken on line 6—6 of Figure 4.
Figure 7:
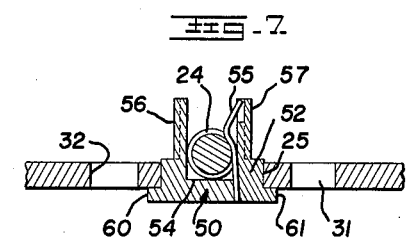
Figure 7 is a horizontal section through one movable indicator and showing the manner in which the same engages a rotary feed screw which drives the indicator.
Figure 8:
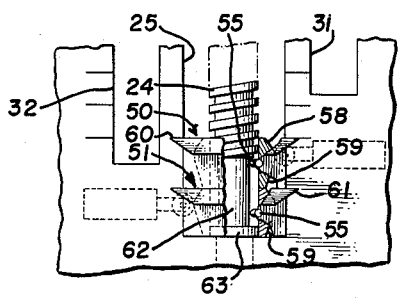
Figure 8 is a further fragmentary side elevation of the lower portion of the timer mechanism shown in Figure 4 with portions of the movable indicators broken away and in section for the purpose of illustration.

Each unit 23 of the timer apparatus 16 further comprises a pair of identical movable indicators 50 and 51. Each indicator embodies a body portion 52 engageable within the slot 25 and provided at its forward side with a finger grip 53 to facilitate disengagement of the indicator from the screw shaft 24 and slot 25 and replacement of the same in a selected adjusted position along the screw shaft. The rear side of each indicator 50 or 51 is recessed at 54 so that the indicator may straddle the screw shaft 24. A detent spring 55 is carried by each indicator as best shown in Figures 6 through 8, which spring yieldably engages the screw-threads of shaft 24 and forms the driving connection between the screw shaft and the indicator so that the shaft may feed the indicator downwardly within the slot 25 after manual placement of the indicator 50 or 51 at the desired location along the slot 25. The spring 55 will readily yield to permit separation of the indicator from the screw shaft 24, as should be obvious. A pair of rearwardly projecting switch-actuating cam extensions 56 and 57 are provided upon the rear side of each indicator 50 and 51, and these cam extensions project rearwardly of the panel 22, as shown. Each cam extension 56 and 57 tapers toward its outer side in cross section, as shown at 58 and at 59 in Figure 8. Each indicator is provided upon opposite sides and at the forward side of the panel 22 with a pair of integral pointers 60 and 61 for coaction with certain of the previously described visible scales of the timer apparatus.

As shown particularly by Figure 8, the lower end portion of each screw shaft 24 is undercut and free of screw-threads, as at 62, and a shoulder 63 is formed upon the screw shaft at the bottom of its undercut portion 62. The arrangement is such that when each indicator 50 and 51 is fed downwardly by the screw shaft 24 to the full extent of the screw-threads upon such shaft, the detent spring 55 will automatically disengage the screw-threads and the indicator will no longer be driven by the screw shaft but will be seated in the lower portion of the slot 25 free from driving engagement with the screw shaft. When the pair of indicator 50 and 51 are both disposed below the screw-threaded portion of the shaft 24, as in Figure 8, the indicators will be in superposed contacting relation and idle when the screw shaft is rotating. In this condition, the lowermost indicator 51 may be removed bodily from the slot 25 and placed at the desired point in the slot 25 adjacent to the screw-threaded portion of the shaft 24. When the lowermost indicator 51 is thus removed, the upper indicator 50 will drop by gravity to the bottom of the slot 25 as should now be apparent.

Figure 2:
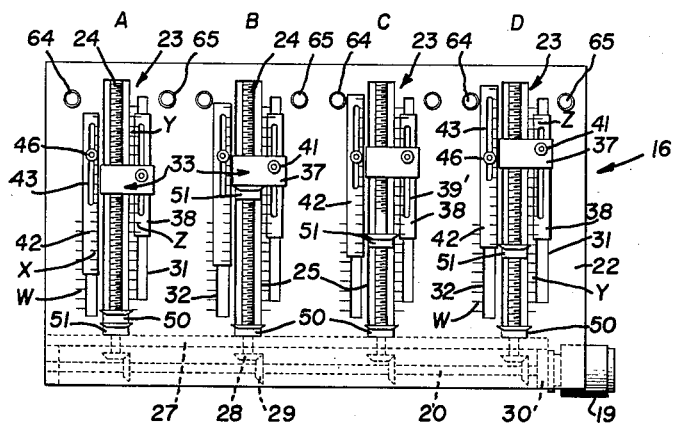
Figure 2 is a side elevation of the variable process timer embodied in the invention.
Figure 4:
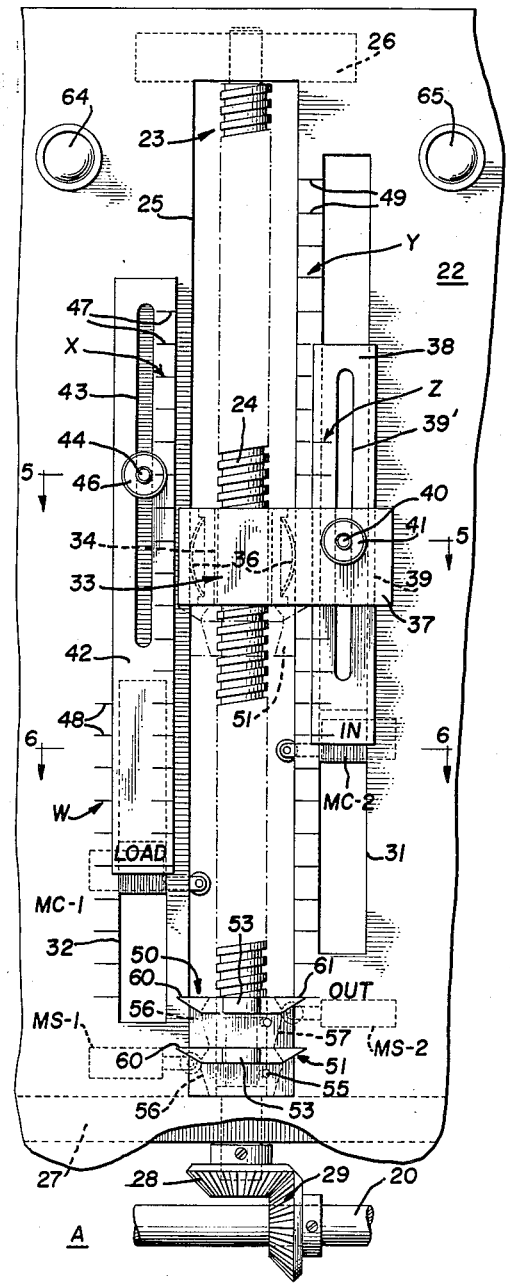
Figure 4 is a further enlarged fragmentary side elevation of a section or unit of the timer mechanism exhibited in Figure 2.
Figure 9:
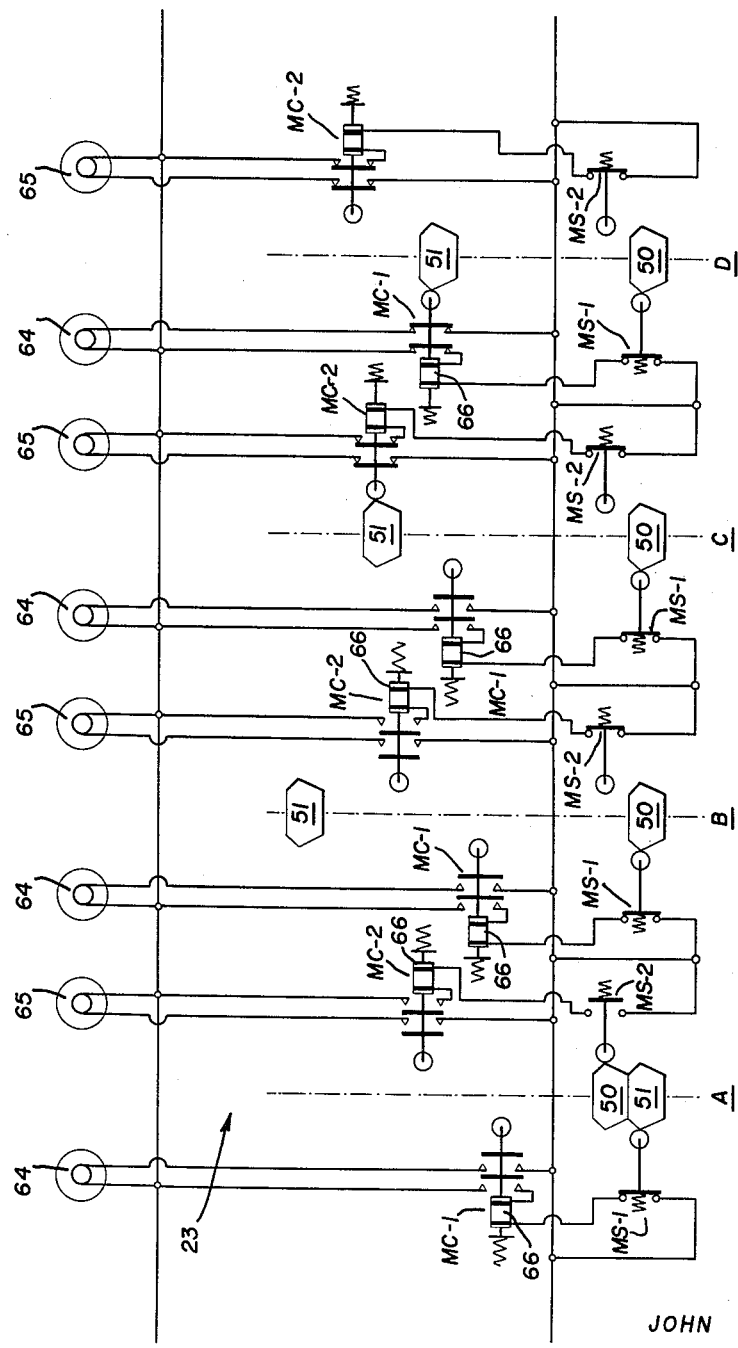
Figure 9 is an electrical schematic diagram wherein the positions of the movable indicators correspond to their positions in Figure 2.

It should be pointed out here that Figure 4 of the drawings being a fragmentary enlargement of Figure 2 shows the left hand timing unit 23 of Figure 2, with the various parts adjusted in the same manner as shown in Figure 2 for the variable-treatment station A. Furthermore, diagrammatic Figure 9 shows the elements of the timer 16 positioned corresponding to Figure 2.

When the system is first started, the two adjustable rules 38 and 42 are adjusted to the position corresponding to the time of approach for the considered treatment station, then, when the operator is aware of the details of the operations a given work unit 14 will undergo in the system, the slidable index element 33 is moved to a position which corresponds on scale X to the variable treatment time and/or on scale Y to the total processing time. Loading of the work is then permissible, and when it occurs, the indicator 51 in the lower position is removed and set immediately below the index element 33 on the screw shaft 24. The second indicator 50 previously resting on top of the one just removed simultaneously drops downwardly by gravity, as previously explained in connection with Figure 8. The elements of the apparatus now occupy the positions illustrated for station B of Figure 2.

Each time the conveyor chain 10 advances one cycle, the feed screw 24 revolves a corresponding amount, which results in downward feeding of the indicator upon the screw shaft. It is quite clear that the pointer 61 on the right hand side of the indicator will indicate the position occupied by the work unit 14 under processing. When said indicator reaches the position illustrated for station C of Figure 2, that is to say, when the pointer 61 faces the last scale graduation marked "in" of scale Z, see Figure 4, it is apparent that the time corresponding to the approach has just elapsed, and the work unit in question now enters the variable-treatment stage composed of stations A, B, C or D. Here again, in its downward movement on the screw shaft 24, the pointer 61 will keep the operator informed as to the amount of variable treatment a given work unit 14 has already received.

When the moving indicator reaches the position corresponding to station D, Figure 2, the left hand pointer 60 faces the last graduation of the scale X. This indicates that before the variable-treatment is over, a time corresponding to the time duration of approach will elapse. In other words, if a work unit 14 intended to be directed to the same station of variable-treatment is then loaded on the conveyor chain 10, it will reach said station A, B, C or D at the time the article or work unit presently under process will have completed its treatment. To this end, the bottom graduation of the scale X is marked "Load," see Figure 4. It indicates that from then on loading is permissible, although loading does not have to be done immediately at this time. Another indicator 50 or 51 could eventually grant the same "permission" but it is obvious that for maximum exploitation of the installation, the time when the pointer 60 faces the "Load" graduation on the scale X is the ideal time for loading the conveyor chain.

When the indicator again reaches the position shown for station A in Figure 2, the treatment is over, and the corresponding graduation on the scale Y adjacent the pointer 61 reads "Out." In addition to the apparatus 16 giving quantitative indications relating to the position of a work unit undergoing processing, the apparatus is also provided with means to give qualitative information relating to ultimate measures to be taken by the operator at the loading station 15.

Figure 3:
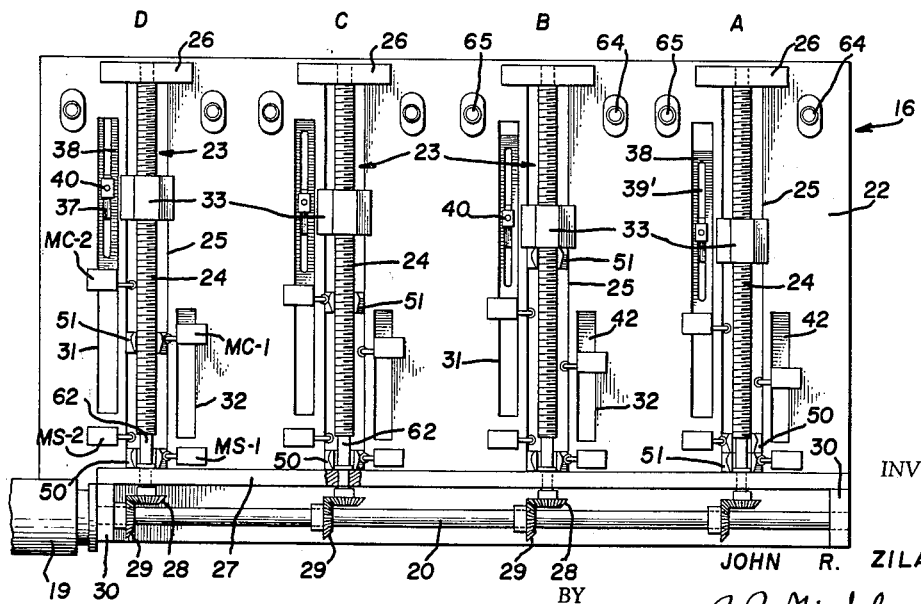
Figure 3 is a rear side elevation on an enlarged scale of the timer shown in Figure 2.

With particular reference to Figure 9 of the drawings, said means comprises for each timing unit 23 one green light 64 in circuit with a micro-contactor MC-1 and a micro-switch MS-1 for giving information about the possibility of loading the conveyor chain. In each timing unit 23, there is further provided one orange light 65 in circuit with a micro-contactor MC-2 and a micro-switch MS-2 for indicating whether or not a particular work unit is in the stage of long variable-treatment. As shown in Figures 3 and 6, micro-contactor MC-1 is carried by or integral with the rule 42 having the scale X, and micro-contactor MC-2 is carried by or integral with the rule 38 having the scale Z. The two micro-switches MS-1 and MS-2 of each unit 23 are fixedly mounted upon the rear face of panel 22 as shown in Figure 3 and also in Figure 4. Micro-contactors MC-1 and MC-2 and micro-switch MS-1 are normally open, whereas micro-switch MS-2 is normally closed as indicated in Figure 9.

With continued reference to Figures 2 and 9, when a work unit 14 is just loaded, station B, the removal of the lowermost indicator 51 causes opening of micro-switch MS-1, then, the second indicator 50 moving downwardly by gravity causes the closing of micro-switch MS-2 (normally closed) and the closing of micro-switch MS-1. Both light circuits for the green and orange lights 64 and 65 of the particular timing unit 23 are now open, and both lights are out.

When the indicator 51, station C, actuates micro-contactor MC–2, the circuit of the adjacent orange light 65 is closed, and this light goes on at the same time that a work unit 14 enters the corresponding station of the variable-treatment stage. The orange light 65 stays on since the solenoid of micro-contactor MC–2 in series with the orange light circuit is now energized, said solenoid being indicated at 66 in Figure 9. When the indicator 51 moves to the "out" scale graduation, Figure 4, micro-switch MS–2 is simultaneously opened and the orange light 65 goes out and the solenoid is no longer energized. In brief, the orange light is on as soon and as long as a given work unit 14 is undergoing variable-treatment at the station A, B, C or D.

When the indicator 51 reaches the "Load" graduation of scale X, micro-contactor MC–1 is closed, and the green light 64 goes on, indicating that loading is permissible. The green light will stay on as long as the indicator keeping micro-switch MS–1 closed has not been removed, that is to say, as long as the loading has not actually been done.

As shown in the drawings, the orange and green lights 64 and 65 for each unit 23 of the timer apparatus 16 are conveniently mounted upon the panel 22 near the top of the same.

It is to be understood that the form of the invention herewith shown and described is to be taken as a preferred example of the same, and that various changes in the shape, size and arrangement of parts may be resorted to, without departing from the spirit of the invention or the scope of the subjoined claims.

Having thus described my invention, I claim:

1. A control timer for a variable process system including a cyclicly operated conveyor element, said timer comprising a support, rotary drive means associated with the support and adapted to be operated in synchronism with said conveyor element, a plurality of rotary feed means carried by the support and driven in unison by the drive means and corresponding to variable process stations of said system, an index element movably associated with each of said feed means and shiftable lengthwise thereof and adapted to remain in selected adjusted positions, an indicator removably connected with each feed means and adapted to be manually engaged therewith at a selected point on the feed means, whereby rotation of the feed means will move the indicator in one direction longitudinally of the feed means, a variable-treatment scale connected with the support near each feed means for indicating the duration of variable-treatment, a total treatment scale on the support near each feed means for indicating the time of total treatmen, and a time of approach scale carried by said index element near the total treatment scale, said scales having spaced graduations representing complete cycles of operation of said conveyor element.

2. A control timer for a variable process system including a cyclicly operated conveyor element, said timer comprising a support, a plurality of feed means carried by the support and corresponding to stations of the variable process system, common operating means for all of said feed means and driven in synchronism with said cyclicly operated conveyor element, a movable index element associated with each feed means and free of driven connection with the feed means but shiftable longitudinally thereof to a selected adjusted position, a time of approach scale carried by the index element and extending longitudinally of the feed means, a total treatment time scale upon the support near the feed means and time of approach scale and extending longitudinally thereof, a variable treatment time scale upon the support near the feed means and extending longitudinally thereof, and at least one indicator movably connected with the feed means and adapted to be driven longitudinally of the feed means in one direction by the feed means, said indicator coacting with said scales to impart to an operator quantitative information relating to the position of a work unit on the conveyor element undergoing processing.

3. In a variable process system including variable process stations, a cyclicly operated conveyor element to convey work units to and from said stations, control timer mechanism, said mechanism comprising a support, a plurality of feed means carried by the support and corresponding to said stations of the system, common operating means for all of said feed means, means to drive the cyclicly operated conveyor element and common operating means in synchronism, a movable index element associated with each feed means and free of positive connection therewith, an indicator engageable with each feed means at selected points upon the feed means and adapted to be driven by the feed means in one direction, scale means carried by the support near the index element and indicator and cooperating therewith to provide quantitative information relating to the positions of work units undergoing processing in the system, signal light means associated with the support near each feed means to provide qualitative information relating to actions to be taken by an operator who loads the work units on the conveyor element, and electrical means connected in circuit with the signal light means and actuated by movements of said indicator to control the operation of the signal light means.

4. A control timer for a variable process system including a cyclicly operated conveyor element, said timer comprising a support, a plurality of feed means carried by the support and corresponding to variable process stations of said system, common operating means for all of said feed means and adapted to be driven in synchronism with the cyclicly operated conveyor element, a movable index element associated with each feed means and free of positive connection with the feed means, an indicator operably connected with each feed means to be driven thereby in one direction and engageable with the feed means at desired locations upon the same, an approach setting scale on said support near one side of each feed means, a variable treatment time scale adjustably mounted upon the support near the approach setting scale and adjacent said side of each feed means, a total treatment time scale on the support near the other side of each feed means, a time of approach scale adjustably mounted upon said index element and arranged near the total treatment time scale, all of said scales graduated in cycles of operation of said conveyor element, said indicator coacting with said scales to provide information concerning the position of a work unit on the conveyor element undergoing processing, a pair of signal lights of unlike color mounted upon the support adjacent each feed means to provide information relating to the loading of work units on the conveyor element, and circuit maker and breaker means operated by movement of the indicator for controlling the operation of the signal lights.

5. A control timer for a variable process system, said timer comprising a support, a plurality of feed means carried by the support and corresponding to variable process stations of the system, means to operate said feed means in synchronism with a work conveyor element of said system, a movable index element carried by the support near each feed means, a total treatment time scale carried by the support near each feed means for coaction with the index element, a time of approach scale carried by the movable index element and arranged adjacent to the total treatment time scale, an indicator for each feed means and connected therewith and adapted to be driven thereby longitudinally of said scales, a variable-treatment time scale carried by said support near each feed means for coaction with said indicator, an approach setting scale on said support near the variable-treatment time scale for coaction therewith, signal light means carried by the support near each feed means, switch means connected in circuit with the signal light means to control the latter, and cam means carried by said indicator for actuating the switch means, the switch means being in the path of movement of the indicator when the latter is driven by said feed means.

6. A control timer for a variable process system including variable-treatment stations and a conveyor element to carry work units to and from said stations, said control timer comprising a plurality of variable-treatment time scales corresponding to said variable-treatment stations, a corresponding number of total treatment time scales arranged near the variable-treatment time scales, an index element for each total treatment time scale and adjustable longitudinally thereof to a selected adjusted position, a time of approach scale bodily carried by each index element and being near the total treatment time scale for coaction therewith, at least one movable indicator for each variable-treatment and total treatment time scale and adapted to be initially positioned in a selected position along the variable-treatment time scale, power-operated means engageable with said indicator to advance the same in one direction along the variable-treatment time scale in synchronism with the movement of said conveyor element, signal light means arranged adjacent each variable treatment and total treatment time scale, and electrical switch means in the path of travel of each said indicator and operated by the movement of the indicator to control the operation of said signal light means.

7. A control timer for a variable process system including variable-treatment stations and a movable conveyor element to carry work units to and from said stations, said control timer comprising a plurality of variable-treatment time scales corresponding to said stations, a corresponding number of approach setting scales arranged adjacent to said variable-treatment time scales, a corresponding number of total treatment time scales arranged near said variable-treatment time and approach setting scales, a movable index element for each group of said scales and adjustable longitudinally thereof to a selected adjusted position, a time of approach scale carried by each movable index element and arranged adjacent to the total treatment time scale, a pair of movable indicators associated with each group of said scales and adapted to be initially positioned at one side of the index element when the latter is in the selected adjusted position, power-operated means for the indicators of each group of scales to advance such indicators in one direction along said scales and operated in synchronism with said conveyor element, a pair of signal lights of unlike color arranged near each group of scales, first and second electromagnetic switch devices associated with said variable-treatment time and time of approach scales and arranged in the path of travel of each movable indicator to be successively actuated thereby when the indicator moves in said one direction, said electromagnetic switch devices connected in circuit with said signal lights, and first and second switches arranged adjacent to said indicators when the latter are in inactive positions near the bottoms of said approach setting and total treatment time scales and engageable with said indicators and connected in circuit with the electromagnetic switch devices.

8. A control timer for a variable process system according to claim 7, wherein said variable-treatment time scale is longitudinally adjustable with respect to said approach setting scale and said time of approach scale on said index element is longitudinally adjustable relative to the total treatment time scale and said first and second electromagnetic switch devices are carried by said adjustable variable treatment time scale and time of approach scale respectively.

9. A control timer for a variable process system according to claim 8, wherein said first and second electromagnetic switch devices and said first switch are normally open and said second switch is normally closed.

10. A control timer for a variable process system including a plurality of variable treatment stations and a cyclicly operated conveyor element, said timer comprising a plurality of feed means corresponding to stations of the variable process system, operating means for said feed means and driven in synchronism with said conveyor element, movable index means for each feed means and shiftable longitudinally thereof to a selected adjusted position along the feed means, a time of approach scale connected with said index means and extending longitudinally of the feed means, a variable treatment time scale positioned near the feed means and movable index means and extending longitudinally of the feed means, and an indicator movably connected with the feed means and adapted to be driven longitudinally of the feed means in one direction by the feed means, whereby said indicator may coact with the variable treatment time scale and the time of approach scale, said scales being graduated in cycles of operation of said conveyor element.

References Cited in the file of this patent

UNITED STATES PATENTS

| | | |
|---|---|---|
| 572,563 | Opdyke | Dec. 8, 1896 |
| 1,528,227 | Spooner | Mar. 3, 1925 |
| 1,900,907 | Buxton | Mar. 14, 1933 |